No. 691,980. Patented Jan. 28, 1902.
V. SPIETSCHKA.
TANK WAGON FOR DELIVERING FERMENTED LIQUIDS.
(Application filed Apr. 27, 1901.)
(No Model.) 2 Sheets—Sheet 1.
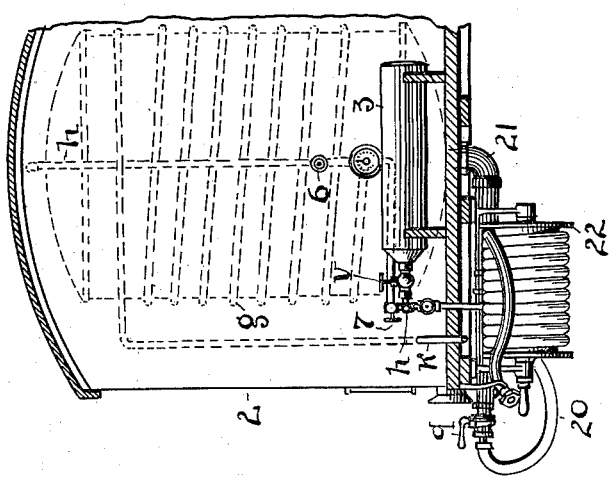

No. 691,980. Patented Jan. 28, 1902.
V. SPIETSCHKA.
TANK WAGON FOR DELIVERING FERMENTED LIQUIDS.
(Application filed Apr. 27, 1901.)
(No Model.) 2 Sheets—Sheet 2.
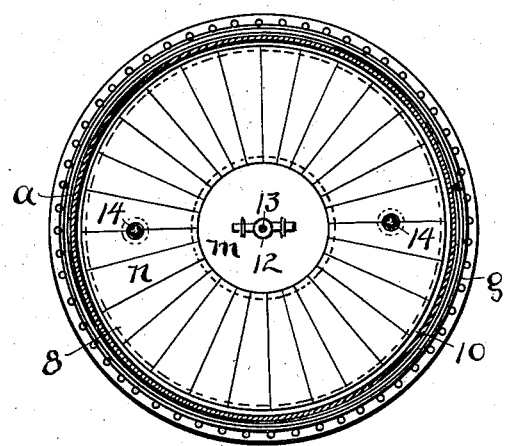
FIG. 3.
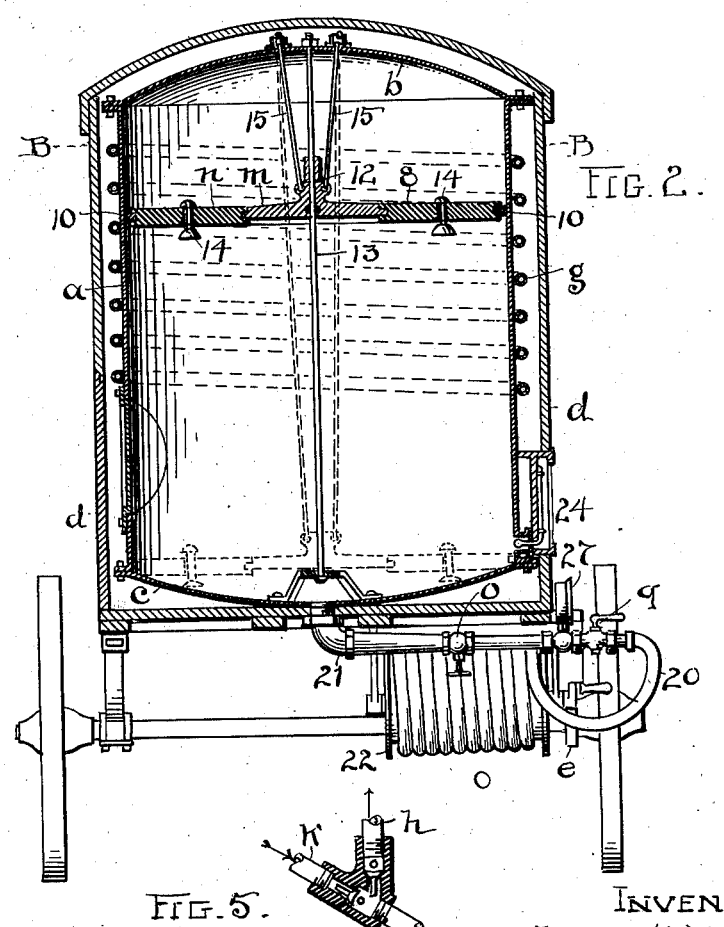
FIG. 2.
FIG. 5.
ATTEST.
INVENTOR.
Vinzenz Spietschka
By H. F. Fisher Atty

UNITED STATES PATENT OFFICE.

VINZENZ SPIETSCHKA, OF LOUISVILLE, OHIO.

TANK-WAGON FOR DELIVERING FERMENTED LIQUIDS.

SPECIFICATION forming part of Letters Patent No. 691,980, dated January 28, 1902.

Application filed April 27, 1901. Serial No. 57,699. (No model.)

*To all whom it may concern:*

Be it known that I, VINZENZ SPIETSCHKA, a citizen of the United States, residing at Louisville, in the county of Stark and State of Ohio, have invented certain new and useful Improvements in Tank-Wagons for Delivering Fermented Liquids; and I do declare that the following is a full, clear, and exact description of the invention, which will enable others skilled in the art to which it appertains to make and use the same.

My invention has reference to improvements in tank-wagons for delivering fermented liquids to customers from a common tank under carbonic-acid pressure; and the invention consists in a liquid-delivering tank-wagon comprising a tank and wagon and associated parts constructed, combined, and operating substantially as shown and described, and particularly pointed out in the claims.

In the accompanying drawings, Figure 1 is a side elevation of my new tank-wagon in which the wall inclosing the tank is broken away partly at one side to show internal constructions. Fig. 2 is a cross-section of the tank and wagon on a line corresponding substantially to A A, Fig. 1; and Fig. 3 is a cross-section of the tank above the cover or float therein looking down from line B B, Fig. 2. Fig. 4 is a sectional elevation of the tank-wagon looking toward the front, and Fig. 5 is a detail sectional view of the valve-chamber for the pump.

In the construction thus shown I employ a suitably-constructed vehicle as respects size and strength, provided with a platform or body 2, of any suitable style or pattern, and an upright liquid-transportation tank $a$, having the proportions relatively as shown, so as to carry a considerable quantity of liquid. In this instance said tank stands upright instead of lying in a horizontal plane, as tanks are ordinarily arranged upon vehicles for carrying water, oil, and other liquids, and this is desirable in the present instance by reason of one or more features of the invention which depend largely on an upright position of the tank to be of any practical value.

The tank $a$ is preferably of sheet metal, iron, or steel and internally enameled, so as to resist chemical action. Both its ends $b$ and $c$, respectively, are preferably convex or rounded outwardly and firmly riveted about their edges upon the flanged extremities of the side of the tank. The said tank rests upon the bottom of its inclosing casing $d$ or upon any other suitable base or support, and the said casing or cover is preferably of wood, but may be of any equivalent material, the idea being to make the same an inclosure which will serve the purpose of a jacket with an air-space between it and the tank and in which cooling-coils are wound about the tank and adapted to cool the air in said space, and thus keep the contents of the tank cool also. The said spirally-arranged cooling-coil is a circulating coil or pipe for carbonic-acid gas from any one of the series of gas-tanks 3, 4, and 5 with which said pipe may for the time be connected. As here shown, it is connected with tank 3; but it may be connected with either of the reserve-tanks 4 and 5 after tank 3 is exhausted. By thus circulating gas in the cooling-coil the temperature in the air-jacket is kept down low enough to deliver cool beer from the transportion-tank in the warmest weather and climates. Circulation is in this instance promoted by a suction-pump $f$, having a piston operated from an eccentric $e$ on the wagon-wheel and connected by pipe $k$ with the top of the coil about tank $a$, Fig. 1, so that when the wagon is traveling circulation of the gas must inevitably follow and what is withdrawn is replaced by fresh gas from the acid-tank. Pump $f$ discharges into the gas-delivery pipe $h$ through a suitable joint at the end of the acid-tank; but the connection may be directly to said tank or to any point in the gas output therefrom, and any equivalent means for operating pump $f$ may be adopted. Of course in the present arrangement of pump and pipes with the acid-tanks the pump will also force gas forward into the beer-tank as well as withdraw it therefrom, and thus establish equilibrium in the system.

The gas-delivery pipe $h$ from the gas-tank leads to the dome of the transportion-tank and connects with the coil $g$, as shown here, and is controlled by a valve 6 from without casing $d$, while valve 7 controls the flow of gas to both pipes $g$ and $h$. Obviously any other equivalent or sufficient arrangement or disposition of valves for these purposes may be adopted and one or more carbonic-acid storage-tanks may be provided. Each storage-tank has a valve $v$ of its own. The said acid-storage tanks are of any suitable construction for size and strength and are always made and lined so as not to be injuriously affected by the acid and not to impregnate the acid with anything deleterious. They may be located as here shown or in any other available position on top of or beneath the wagon-platform 2.

In the transportation-tank I employ what in a sense is a false cover, diaphragm, or separator 8, the idea being to have a movable cover or float over and upon the liquid in the tank which will move up and down with the liquid and rest thereon and yet serve as practically a separator between the liquid and the acid gas above said cover, diaphragm, or separator. For brevity said part will hereinafter be referred to as a "cover" or "floating cover," and, as shown here, it is constituted of two portions comprising a substantially disk-shaped central or middle piece $m$ and an outer substantially ring-shaped portion $n$, having a rubber ring or like packing 10 in its outer edge working in contact with the inner surface of the tank. The ring $n$ is preferably made of wood, while the center piece $m$ is of metal, preferably malleable iron and relatively light in weight and formed at its middle with a long sleeve 12, adapted to slide freely on central rod 13 and long enough to hold the cover from tilting or swinging on its support. The said rod is rigidly secured at its ends in or upon the ends of the tank. The said cover rises or is raised by the inflowing liquid and always sustains the relation of a float upon its top. Gas-pressure from above helps to keep the float down in working place. The parts $m$ and $n$ are rigid with each other, and the outer ring or rim $n$ is provided with one or more float-valves 14, normally closed from below and adapted to be opened to run out any liquid accumulating over the cover. When the tank is emptied and is to be cleaned below the cover 8, the said cover is raised by means of a set of cords or ropes 15, connected at its center and which pass out through openings in the top of the tank and its inclosing casing. When ropes are not used, the holes for ropes are closed with plugs to avoid escaping carbonic-acid gas. After the tank has been thoroughly cleansed and closed and pumped out sufficiently to enable it to be filled the filling-hose 20 are screwed to pipe connection 21 for that purpose. Entrance to the tank is at its bottom by pipe connection 21, in which there is one valve $o$ and faucet $q$, as here shown, and the hose 20 is wound on a reel or drum 22 beneath the wagon-body. Said hose serves also for delivering or discharging the beer. When the cellar-hose is connected up with the pipe 21 for filling, the tank-valve $o$ and faucet $q$ are opened, and the liquid under pressure runs directly into the tank. If it is beer that is being drawn, the presumption is that it is in a cellar under pressure. As the tank fills the movable cover is lifted gradually thereby to the top of the tank, and the float-valves 14, one or more in said cover, seat and close from below. When the said bottom drops down and the tank is empty, the valves 14 also drop and open of their own gravity. Having filled the tank with beer or other like beverage, carbonic acid is turned into pipes $g$ and $h$ by opening valves 6 and 7 and $v$, when the acid or acid gas flows into both pipes and brings the requisite pressure over or upon cover 8—say five pounds or thereabout—which is constantly maintained. This being done the tank is ready for a trip and delivery to customers. A stationary thermometer 24 within the tank-cooling chamber keeps a record of the temperature about said tank, and a gage 25 tells the man on the front seat the measure of the contents, while meter 27 records the amount or quantity of liquid delivered at any one place. All these things are convenient to the driver, who is charged with the entire supervision of the apparatus.

It is supposed that the saloon-keeper or other customer or retailer has a suitable tank or tanks into which the beer or other beverage is delivered from a wagon of this kind, and to this end the filling-hose 20 is used for making connection from the wagon-tank to the retailer's tank. Thus it will be seen that no beer or other kegs as such are used with this system, and the receiving-tank may have any suitable capacity—say that of two or three barrels or kegs, more or less. Meter 27 shows the quantity withdrawn.

The unloading at the saloon or other point of delivery is as follows: The hose being connected with the saloon-tank and the desired amount of beer taken out, as the meter will show, the wagon-tank is closed and carbonic-acid gas is forced through hose 20 to expel all traces of beer therein, when the hose are again detached and wound up on the wagon-reel, and so on at each place of delivery. When an empty wagon-tank returns to the brewery, the carbonic acid is pumped out of the tank for further use, and the tank being now empty and ready for cleaning is cleaned in the manner already described. The movable cover 8 serves especially to prevent waste of carbonic acid, as well as to preserve the beer from getting flat or even warm in its transfer from the brewery to the place of delivery and use and obviously keeps the acid and beer separated and the cover 8 always down on the body of beer, preventing frothing or foaming.

Among the advantages of this method or system of delivery is the important one of dispensing entirely with the use of beer-kegs. As there are no kegs, there are no coopers, no wash-house man, no wash-machines, no pitch and no pitch-machines, no bungs or corks, no fastening of hoops, no returned beer, no stealing of kegs, no leaks and consequent loss, and hence a greatly-reduced force of laborers and corresponding saving of expense in all these departments of the business, as well as saving of a great amount of detail and annoyance. Indeed, the system cuts off so many of the most objectionable features in or about a brewing establishment and is so clean and satisfactory altogether that it practically transforms the business and totally revolutionizes the system of delivering its output to the trade. Furthermore, every customer gets actually the correct measure of his order, and bottlers can take any quantity of beer out of the tank, while at the same time the beer will remain under carbonic-acid pressure and be good and fresh to the last.

The floating and separating cover, as herein shown and described, is especially adapted for use with fermented liquids, because in case beer or the like be hauled in an open tank without means for keeping it quiet it will roll and dash about in such way as to inevitably produce froth and foam, which is injurious to the beer and materially impairs its keeping quality; but by my invention I close the cover down upon the beer across the entire tank and so confine the beer beneath the cover. The cover cannot rock or roll even though the wagon jolts or swings, and hence there is no foaming or frothing space and the injurious agitation of the beer is practically prevented.

What I claim is—

1. In the delivery of fermented liquids under pressure, a suitable vehicle and a delivery-tank thereon, a carbonic-acid tank and pipe connection from said acid-tank to the top of the delivery-tank, a refrigerating-coil about the delivery-tank to cool the same, and a pump connected with said coil to enforce circulation, substantially as described.

2. A tank-wagon for delivering liquids under pressure comprising a transportation and delivery tank set upright on the wagon, a casing about the tank, a refrigerating-coil spirally about said tank within said casing, and a carbonic-acid tank with which the said coil is united and a pump to create enforced circulation of acid through said coil, substantially as described.

3. In the delivery of fermented liquids, a suitable vehicle and a delivery-tank having a closed chamber about the same, in combination with a tank containing a cooling medium and a coil open thereto and extending around the delivery-tank, and a pump connected with said coil to produce circulation therein, substantially as described.

4. A suitable vehicle, in combination with a liquid-delivery tank thereon, a cover for the liquid movable up and down in the tank, an upright through said cover to prevent tilting by the rolling of the liquid, means to maintain an artificial fluid-pressure over said cover, and flexible means for raising the cover, substantially as described.

5. The wagon and the tank set endwise thereon, a movable liquid-cover in said tank having a central sleeve and a central upright on which the said sleeve is guided and the cover held firmly in the same position horizontally to prevent rolling or pitching of the liquid, and float-valves in the said cover, substantially as described.

6. A tank-wagon and a delivery-tank thereon and a cooling-casing surrounding said tank, a carbonic-acid tank, a refrigerating-coil between the delivery-tank and its casing open to said carbonic-acid tank, a return-pipe from said coil and a suction-pump connected with said pipe and having an outlet open to the said carbonic-acid tank, whereby a circulation of gas is enforced through said coil, substantially as described.

7. The wagon and a delivery-tank and a carbonic-acid tank on said wagon, in combination with a cooling-coil about the delivery-tank and a pump operating between one end of said coil and said acid-tank, whereby a circulation is established through said coil, substantially as described.

8. In delivery-wagons for liquids under pressure, an upright tank of uniform cross-section between its ends, a cover adapted to float on the liquid therein and having flexible packing about its edge next to the side of the tank, an upright guide on which said cover is adapted to slide and is held from pitching by the rolling of the liquid, automatically-closing valves in said cover, and means to raise and suspend the cover in the tank, substantially as described.

9. In delivery-wagons for liquid beverages, a delivery-tank and delivery-hose connected with the bottom thereof, in combination with a carbonic-acid tank and pipe connections therefrom to the said hose, whereby carbonic acid can be forced through the hose after using to cleanse them, substantially as described.

Witness my hand to the foregoing specification this 26th day of March, 1901.

VINZENZ SPIETSCHKA.

Witnesses:
 HUGO STANDKE,
 ROBERT OSTERMAYER.